United States Patent
Farkas et al.

(10) Patent No.: US 6,304,041 B1
(45) Date of Patent: Oct. 16, 2001

(54) SELF-OSCILLATING DIMMABLE GAS DISCHARGE LAMP BALLAST

(75) Inventors: Thomas Farkas, Marlborough, MA (US); Emad Andarawis Andarawis, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/729,752

(22) Filed: Dec. 6, 2000

(51) Int. Cl.[7] ........................................................ G05F 1/00
(52) U.S. Cl. ......................... 315/291; 315/224; 315/276; 315/287; 315/291; 315/307; 315/DIG. 4; 315/DIG. 7
(58) Field of Search ..................................... 315/291, 307, 315/209 R, 224, 225, 283, 287, 276, DIG. 4, DIG. 7

(56) References Cited

U.S. PATENT DOCUMENTS

| | | | |
|---|---|---|---|
| 5,914,572 | * 6/1999 | Qian et al. | 315/209 R |
| 5,965,985 | 10/1999 | Nerone | 315/DIG. 4 |
| 6,111,363 | * 8/2000 | Nerone | 315/224 |
| 6,133,697 | * 10/2000 | Nagai et al. | 315/DIG. 4 |
| 6,137,240 | * 10/2000 | Bogdan | 315/307 |

* cited by examiner

Primary Examiner—Don Wong
Assistant Examiner—Thuy Vinh Tran
(74) Attorney, Agent, or Firm—Toan P. Vo; Noreen C. Johnson

(57) ABSTRACT

A ballast includes a resonant load circuit having a resonant inductance and a resonant capacitance. The load circuit couples a.c. current to a gas discharge lamp. A self-oscillating complementary converter circuit of the ballast induces a.c. current in the resonant load circuit. The converter circuit includes a pair of switches serially connected between a d.c. voltage bus and a reference bus. Respective reference nodes of the switches are interconnected at a common node through which the induced a.c. current flows, and respective control nodes of the switches are substantially directly interconnected. A gate drive circuit controls the switches. The gate drive circuit includes a drive winding connected to the control nodes. The drive winding is mutually coupled to the resonant inductance for sensing current therein, and an inductor is serially connected to the drive winding and to the common node. A clamping circuit is directly coupled across terminals of the inductor of the gate drive circuit and controls voltage across the inductor in response to an error signal. The error signal represents the difference between a user-selectable signal and a feedback signal that represents a time-averaged value of a lamp operating parameter. The ballast circuit of the invention allows a user to adjust the output of the lamp while it operates. The ballast circuit improves over conventional ballast circuits by eliminating a bulky mutually coupled winding, thereby reducing ballast mass and volume.

15 Claims, 4 Drawing Sheets

SELF-OSCILLATING DIMMABLE GAS DISCHARGE LAMP BALLAST

FIELD OF THE INVENTION

The invention pertains to a ballast for a compact gas discharge lamp, and more particularly to a ballast that uses regenerative gate drive circuitry to control a pair of serially connected, complementary conduction type switches of a d.c.- to- a.c. converter for producing a lamp driving signal.

BACKGROUND OF THE INVENTION

Gas discharge lamps such as fluorescent lamps produce light by exciting a gas with a high voltage a.c. signal generated by the drive section of a ballast circuit. The intensity of illumination is determined by the power of the excitation signal, which in turn depends on the signal frequency.

A ballast circuit for a gas discharge lamp is illustrated in U.S. Pat. No. 5,965,985, which issued to Nerone and is commonly assigned to the owner of the present application. U.S. Pat. No. 5,965,985 is incorporated herein by reference in its entirety. FIG. 1 shows Nerone's ballast circuit 10. A gas discharge lamp 12 is powered from a d.c. bus voltage between d.c. bus 16 and reference bus 18 that is converted to a.c. Switches 20 and 22 are serially connected between buses 16 and 18 in the form of a complementary converter circuit. The switches comprise n-channel and p-channel enhancement mode MOSFETs connected in a common source arrangement at a common node 24. The switches may alternatively comprise other devices having complementary conduction modes, such as PNP and NPN bipolar junction transistors.

A resonant load circuit 25 including a resonant inductor 26a and a resonant capacitor 28 receives current through the common node 24. Circuit 25 includes a d.c. blocking capacitor 30 and a snubber capacitor 32. Lamp 12 includes resistively heated cathodes 12a and 12b that are supplied with heating current by windings 26c and 26d mutually coupled to inductor 26a. Switches 20 and 22 cooperate to provide a.c. current from the common node 24 to resonant inductor 26a.

The gate electrodes 20a and 22a of the switches are connected at a control node 34. Gate drive circuitry, generally designated 36, is connected between control node 34 and common node 24, and implements regenerative control of switches 20 and 22. A drive winding 26b is mutually coupled to resonant inductor 26a, which carries a voltage proportional to the instantaneous rate of change of current in load circuit 25. A transformer winding 38a serially connected to the driving inductor 26b couples a controlled voltage in series with the driving inductor 26b as described below.

A bidirectional voltage clamp 40 comprised of back-to-back Zener diodes cooperates with the transformer winding 38a such that the phase angle between the fundamental frequency component of voltage across resonant load circuit 25 (e.g., from node 24 to node 18) and the a.c. current in resonant inductor 26a approaches zero during lamp ignition. A capacitor 44 is provided between nodes 24 and 34 to predictably limit the rate of change of control voltage between the nodes. This provides a dead time interval during switching of switches 20 and 22 during which neither switch is turned on.

The frequency of the a.c. signal produced by the ballast is controlled by a clamping circuit 62. FIG. 2 shows details of Nerone's clamping circuit. The clamping circuit controls ballast circuit frequency by varying the loading across the transformer winding 38a by means of a controlled impedance, implemented as a MOSFET 72, in response to an error signal. The error signal is produced by a difference amplifier 64 that receives as input a set point signal provided by a user input potentiometer 68, and a lamp current feedback signal provided by low pass filter 60 of FIG. 1. The low pass filter 60 provides a time-averaged signal derived from a lamp current signal sensed by a sensing resistor 54 and rectified by p-n diode 56. Half cycles of lamp current of the other polarity are shunted across resistor 54 by a diode 58. The error signal provided by the difference amplifier 64 is amplified by an error amplifier 70, powered from a node 73, and applied to the gate of the MOSFET 72. The MOSFET 72 determines the voltage across a control winding 38b, which is mutually coupled to the transformer winding 38a of the driving circuit of FIG. 1.

A diode bridge network 74a–74b enables the MOSFET 72 to conduct current through winding 38b in both directions, e.g., first through diodes 74a, 74b and then through diodes 75a, 75b. A capacitor 78 shunts MOSFET 72 to assist in clamping voltage across the control winding. A voltage clamp 80 such as a Zener diode shunts MOSFET 72 to limit the minimum frequency so as to set a maximum voltage across the lamp during ignition. The lower node of MOSFET 72 comprises the reference bus 18 of FIG. 1, and upper node 73 comprises a power supply node coupled via a resistor (not shown) to the d.c. bus 16 of FIG. 1.

A preheat switch 82, such as a p-channel enhancement mode MOSFET, may be provided to conduct for a preheat timing interval when the ballast circuit is first supplied with d.c. bus voltage. When conducting, switch 82 overrides MOSFET 72 by shorting its output. This allows resistively heated cathodes 12a and 12b of FIG. 1 to reach a desired temperature, while maintaining a low voltage across lamp 12, before lamp ignition. A circuit 84 for controlling the preheat switch 82 may be constructed as shown in FIG. 3. As shown in FIG. 3, a comparator 85 receives a reference voltage from circuit 86 on its negative input, and upon bus energization, receives an increasing voltage on its positive input from a preheat capacitor 88. The capacitor is charged by current conducted from node 73 by a preheat resistor 90. The values of resistor 90 and capacitor 88 determine the duration of the preheat period during which switch 82 of FIG. 2 conducts upon bus energization.

Nerone's ballast circuit thus enables control of the brightness of a fluorescent discharge lamp by means of the user input, which controls the voltage across the clamping transformer winding 38a of the driving circuit, thereby determining the frequency of the a.c. voltage applied to the resonant load circuit and thus controlling the current provided to the gas discharge lamp.

BRIEF SUMMARY OF THE INVENTION

The present invention is directed to compact fluorescent lamps that are compatible with standard incandescent light bulb sockets. In these lamps, ballast circuit size is a major contributor to lamp mass and volume. Therefore it is an object of the present invention to provide a dimmable ballast for a compact fluorescent lamp that significantly reduces the size and cost of components of the ballast.

The ballast of the present invention includes a resonant load circuit having a resonant inductance and a resonant capacitance. The load circuit couples a.c. current to a gas discharge lamp. A self-oscillating complementary converter circuit of the ballast induces a.c. current in the resonant load circuit. The converter circuit includes pair of switches serially connected between a d.c. voltage bus and a reference bus. respective reference nodes of the switches are interconnected at a common node through which the induced a.c. current flows, and respective control nodes of the switches are substantially directly interconnected. A gate drive circuit controls the switches. The gate drive circuit includes a drive winding connected to the control nodes. The drive winding is mutually coupled to the resonant inductance for coupling voltage therefrom, and an inductor is serially connected between the drive winding and the common node. A clamping circuit is directly coupled across terminals of the inductor of the gate drive circuit and controls voltage across the inductor in response to an error signal. The error signal represents the difference between a user-selectable set point signal and a feedback signal that represents a time-averaged value of a lamp operating parameter. Additional features in accordance with further objects of the invention are found in the description provided below.

The ballast circuit of the invention allows a user to adjust the output of the lamp while it operates. The ballast circuit improves over conventional ballast circuits by eliminating a bulky mutually coupled winding, thereby reducing ballast mass and volume, and reducing price.

DETAILED DESCRIPTION OF THE INVENTION

Figure 4:
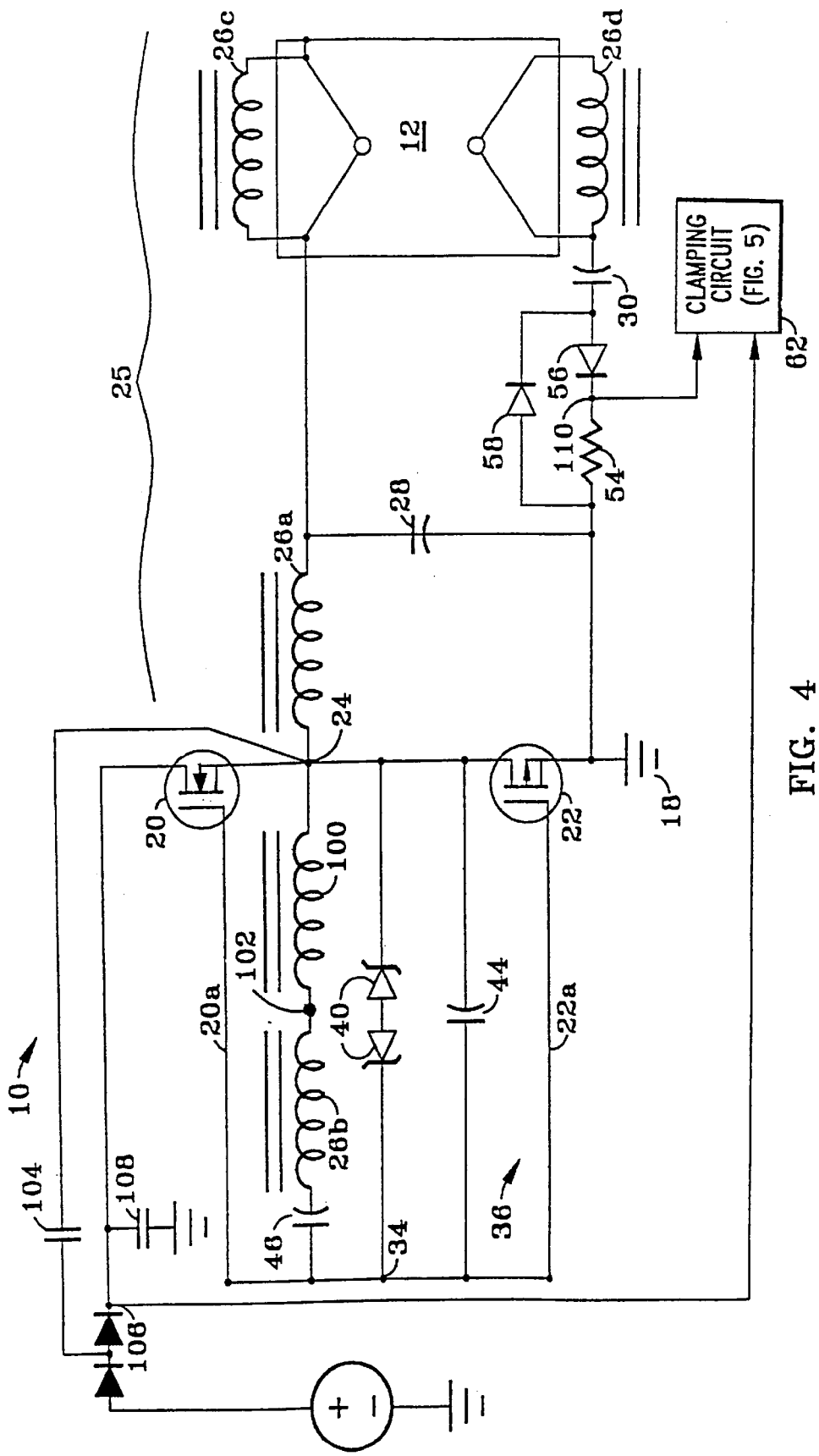
FIG. 4 is a schematic diagram, partially in block form, of a ballast circuit in accordance with an embodiment of the present invention.
Figure 5:
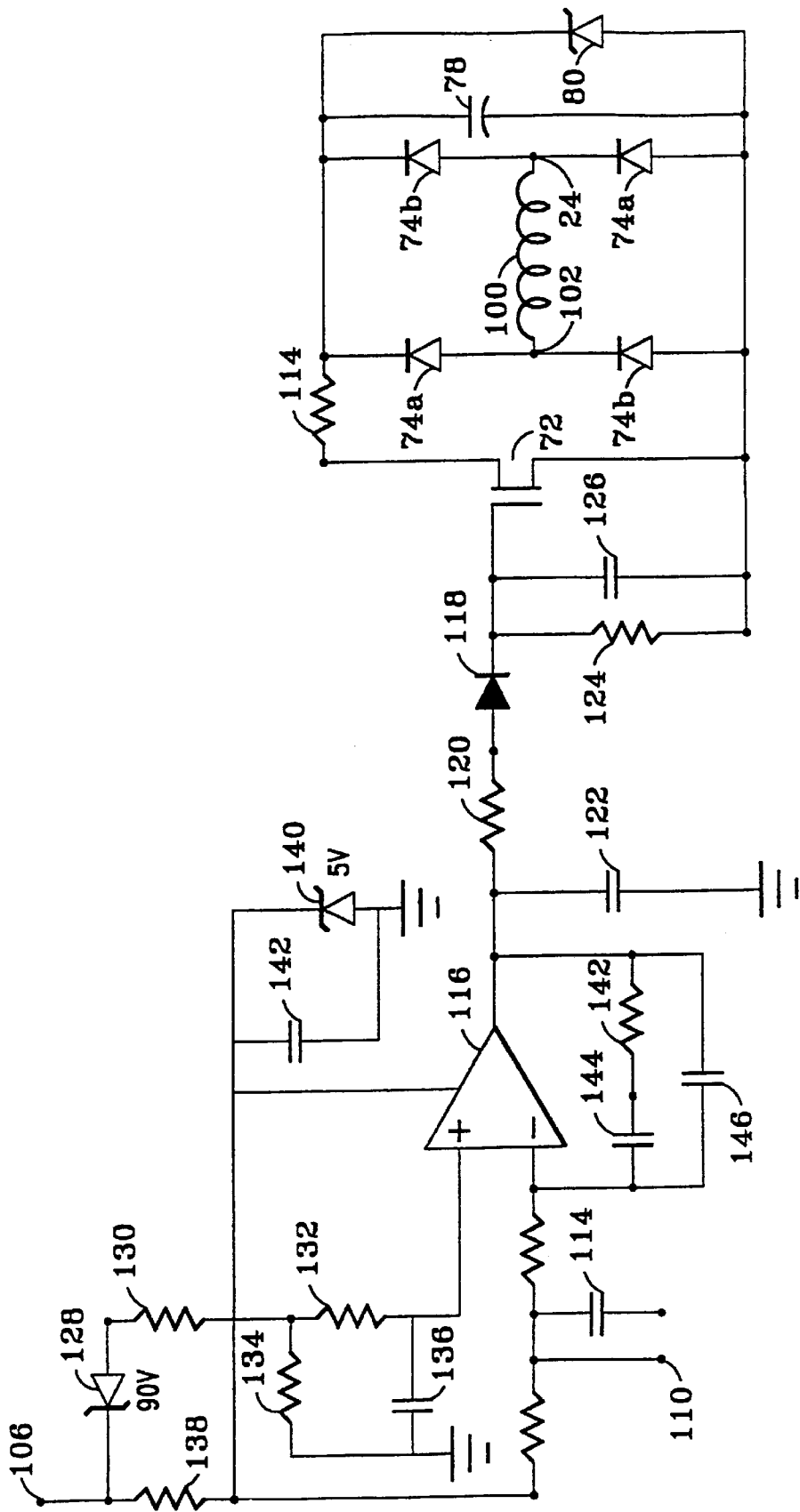
FIG. 5 is a schematic diagram, partially in block form, of the clamping circuit of FIG. 4.

FIGS. 4 and 5 show a ballast circuit and clamping circuit in accordance with an embodiment of the present invention. While the ballast circuit and clamping circuit of the invention are similar to Nerone's circuits in some respects, the invention improves upon Nerone's circuit by eliminating the mutually coupled inductors 38a and 38b that couple the control circuit to the gate drive circuit. In accordance with this embodiment of the invention, the control circuit is directly coupled to terminals of the inductor of the gate drive circuit, allowing the mutually coupled windings of the prior art circuit to be replaced by a single miniature inductor. This feature and additional features of the drive circuit and control circuit of a preferred embodiment of the invention are illustrated in FIGS. 4 and 5. In the following discussion of FIGS. 4 and 5, elements employed in common by the conventional circuit and the illustrated embodiment are referenced using the same reference numerals, and any such common element that is not specifically addressed may be assumed to perform in essentially the manner described with respect to the conventional technology.

FIG. 4 shows a ballast 10 in accordance with an embodiment of the invention. As in the prior art circuit, a gas discharge lamp 12 is powered from a d.c. bus voltage that is converted to a.c. by a complementary converter circuit that includes switches 20 and 22 driving resonant load inductor 26a and resonant load capacitor 28. Switches 20 and 22 cooperate to provide a.c. current from the common node 24 to resonant inductor 26a. The gate electrodes 20a and 22a of the switches are connected at a control node 34. Drive winding 26b is mutually coupled to resonant inductor 26a to induce a voltage proportional to the instantaneous rate of change of current in load circuit 25. A capacitor 104 assists startup of oscillation when power is applied.

Figure 1:
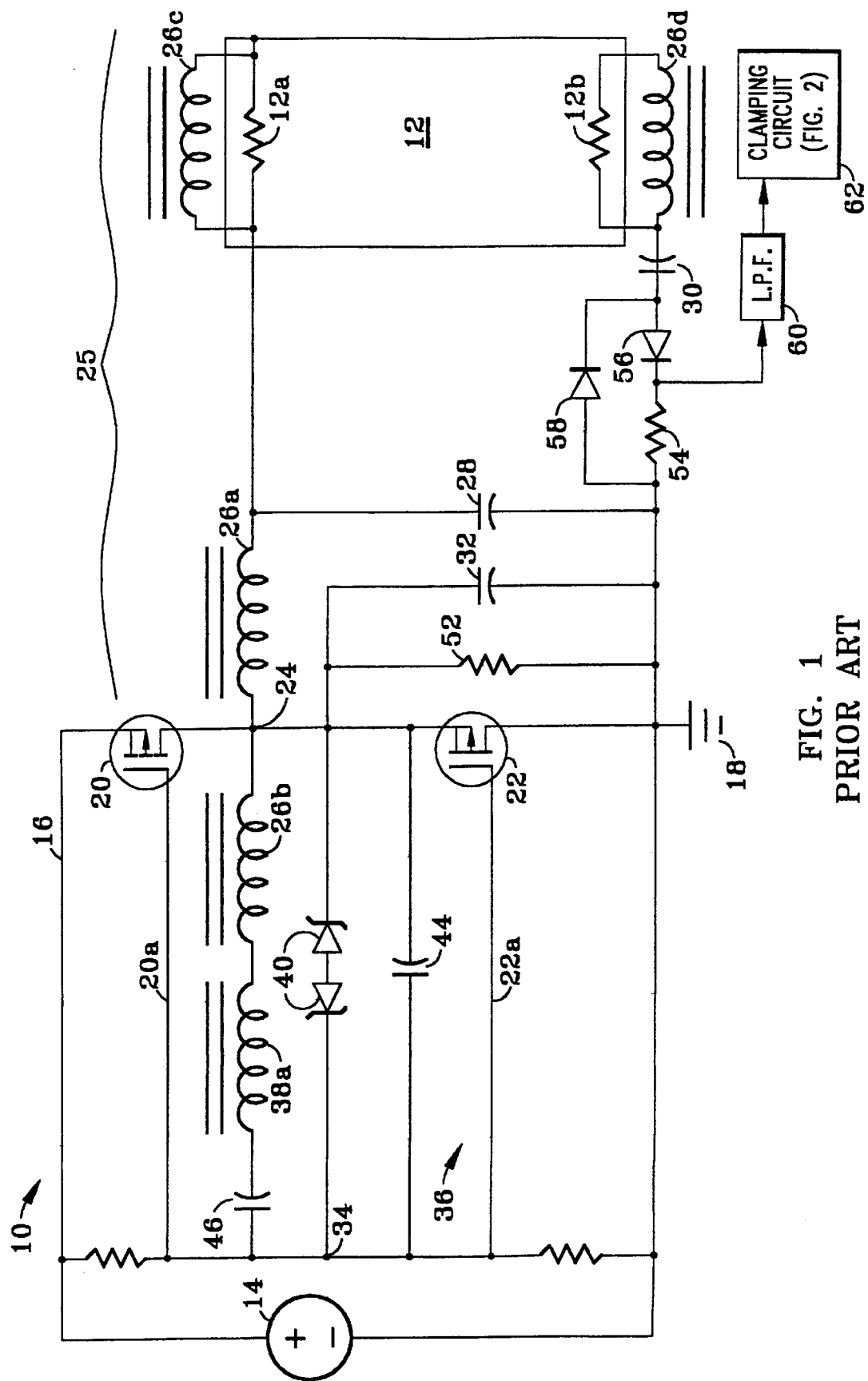
FIG. 1 is a schematic diagram, partially in block form, of a prior art ballast circuit.
Figures 2, 3:
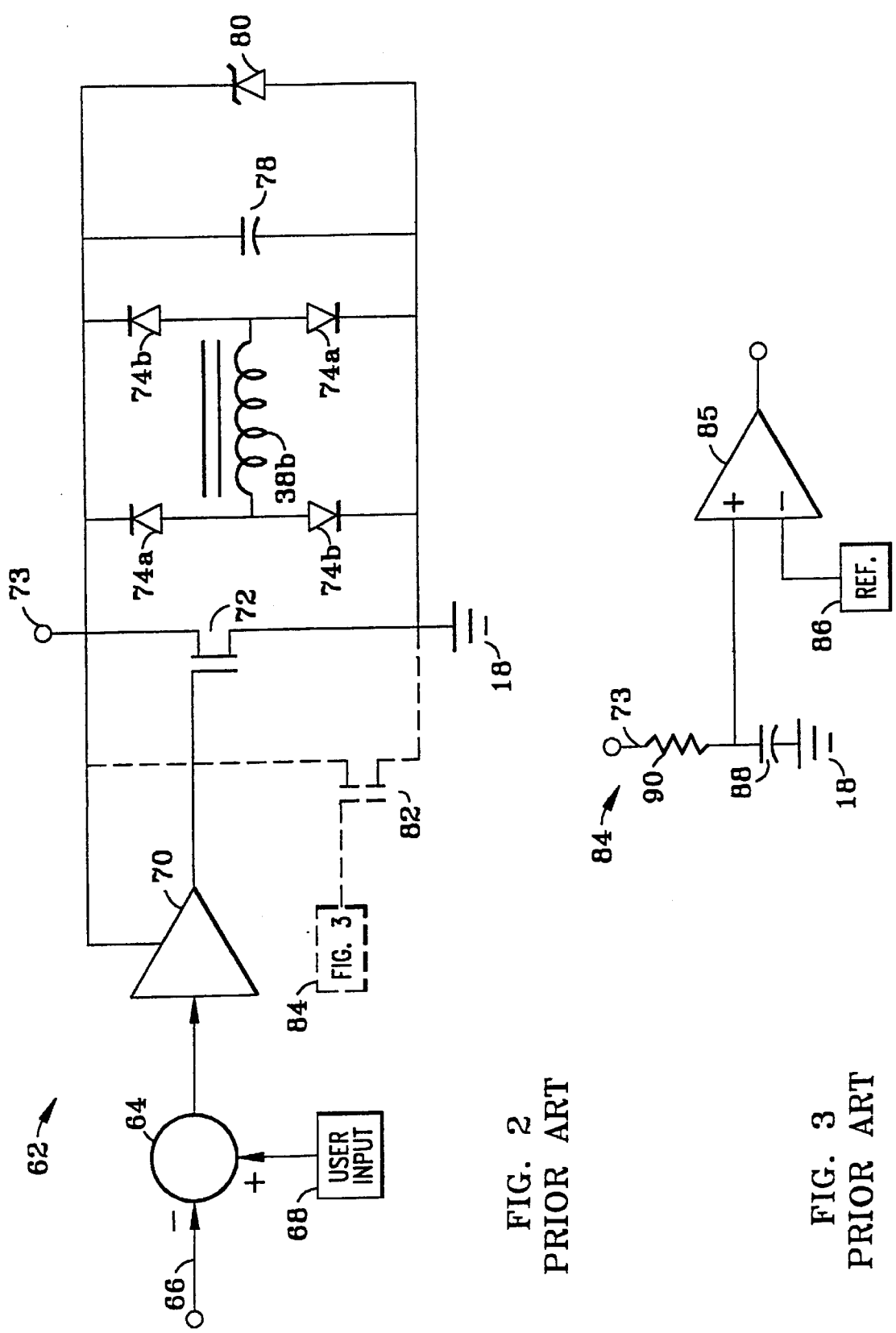
FIG. 2 is a schematic diagram, partially in block form, of the clamping circuit shown in FIG. 1.
FIG. 3 is a schematic diagram of a timing circuit for a preheat switch of FIG. 2.

An inductor 100 serially connected between the drive winding 26b and the common node 24 provides clamping of the voltage across the drive winding 26b by the clamping circuit as described below. In contrast to the prior art circuit, the inductor in accordance with this embodiment of the invention is not mutually coupled to a separate inductor of the clamping circuit, but rather is directly coupled at its terminal 102 and at the common node 24 to the clamping circuit. FIG. 5 shows details of the clamping circuit. The clamping circuit comprises active circuitry that controls the ballast circuit frequency by varying the maximum amplitude of voltage across the inductor 100 by means of a controlled impedance, implemented as a MOSFET 72, in response to an error signal. The terminals of the inductor located at nodes 24 and 102 are coupled directly to inputs of a diode bridge network 74a–74b of the clamping circuit. The MOSFET 72 controls the amount of current flowing through load resistor 114, thereby clamping the voltage across the drive winding 26b of FIG. 1.

An error signal for controlling the MOSFET 72 is provided by a difference amplifier 116. To isolate the difference amplifier 116 from the high control node voltage to which the MOSFET 72 is referenced, a high voltage diode 118 is inserted between the output of the difference amplifier 116 and the gate input of the MOSFET 72. A filter circuit comprised of resistor 120 and capacitor 122, and resistor 124 and capacitor 126, are provided to smooth the error signal waveform.

The clamping circuit receives input signals from nodes 106 and 110 of FIG. 4. The signal from node 110 is a lamp current feedback signal which is filtered by a capacitor 114. The signal from node 106 is a variable d.c. signal that is time averaged by an energy storage capacitor 108. The signal from node 106 is proportional to the d.c. input to the ballast circuit that is derived from the output waveform of a dimmer device such as a triac dimmer. The difference amplifier 116 therefore provides an error signal that is proportional to the difference between the user-selected set point signal, and the time-averaged lamp-current feedback signal. The signal from node 106 is therefore controlled by a user of the dimmer and is employed as a set point signal indicating a degree of dimming desired by the user.

The signal from node 106 is scaled down by means of a zener diode 128 and a resistor divider circuit consisting of resistors 130, 132, 134 and a capacitor 136. The resulting signal is provided as a set point signal to the positive input of the difference amplifier 116. The signal from node 106 is also scaled by a resistor 138 and a zener diode 140, and filtered by a capacitor 142 to provide power to the difference amplifier. The negative input of the difference amplifier receives the lamp current feedback signal from node 110, as well as the scaled down power signal of the zener diode 140, which provides scaling to the lamp current feedback signal. A capacitor 146 provides feedback from the output to the input of the comparator to place the comparator in integrating mode to function as an error amplifier. A series resistor 142 and capacitor 144 provide feedback to cancel one of the poles in the system to enhance the stability to the control loop.

The difference amplifier therefore provides an output for controlling clamping by means of the MOSFET 72 that represents the difference between the set point signal derived from node 106, and the lamp current feedback signal received at node 114.

The embodiment described above uses the average value of the triac dimmer output waveform as being representative of the set point provided by the user to indicate a desired degree of dimming. However, use of the average value as a set point signal has been found to entail undesirable disadvantages including sensitivity to line voltage and a relatively narrow range within which mechanical manipulation of the dimmer produces a change in light level. These problems are overcome by the solution described the copending application entitled "Sensing and Control for Dimmable Electronic Ballast" filed, which is commonly owned and shares common inventorship with the present application, and which is incorporated herein by reference in its entirety. Briefly, the copending application discloses a set point signal generating circuit that senses the duty cycle of the triac output waveform. This solution has been found to significantly reduce line voltage sensitivity and to expand the mechanical dimming range provided by triac dimmers. Those of ordinary skill in the art will recognize that the set point signal generation circuit of the copending application may replace the set point generating signal of the embodiment described above to enable set point signal generation based on duty cycle rather than average value. Accordingly, it is preferred to use the set point signal generating circuit of the copending application in conjunction with the present invention.

The copending application further describes an improved preheat timing circuit and describes the manner in which such circuit is used in conjunction with a clamping circuit to provide improved preheat timing. Those of ordinary skill in the art will recognize from the teaching of the copending application that the preheat timing circuit of the copending application may be integrated into the clamping circuit of the present invention to enable improved preheat timing. Accordingly, it is preferred to use the preheat timing circuit of the copending application in conjunction with the present invention.

While the invention has been described with respect to specific embodiments by way of illustration, many modifications and changes will occur to those skilled in the art. It is therefore to be understood that the appended claims are intended to cover all such modifications and changes as fall within the true spirit and scope of the invention.

What is claimed is:

1. A dimmable ballast circuit for a gas discharge lamp, comprising:
    a resonant load circuit including a resonant inductance and a resonant capacitance for coupling a.c. current to a gas discharge lamp;
    a self-oscillating complementary converter circuit for inducing a.c. current in the resonant load circuit, the converter circuit including a pair of switches serially connected between a d.c. bus and a reference bus, respective reference nodes of the switches being connected at a common node through which the a.c. current flows, and respective control nodes of the switches being substantially directly interconnected;
    a gate drive circuit for controlling the switches, including a drive winding connected between the common node and the control nodes, and mutually coupled to the resonant inductance for coupling voltage therefrom; and
    a clamping circuit including an inductor serially connected between the drive winding and the common node, and active circuitry directly coupled to terminals of the inductor for controlling a maximum voltage amplitude across the inductor in response to an error signal representing a difference between a user-selectable set point signal and a feedback signal representing a time-averaged value of a lamp operating parameter.

2. The ballast circuit claimed in claim 1, wherein the clamping circuit comprises:
    a difference amplifier for providing the error signal;
    a controlled impedance controlled in response to the error signal;
    a diode bridge network allowing the controlled impedance to conduct current in either direction through the inductor; and
    a diode isolating the difference amplifier from the reference voltage of the controlled impedance.

3. The ballast circuit claimed in claim 2, wherein the user-selectable set point signal comprises a time averaged voltage of the d.c. bus.

4. The ballast circuit claimed in claim 2, wherein the user-selectable set point signal is derived from an energy storage capacitor coupled between the d.c. bus and the reference bus.

5. The ballast circuit claimed in claim 2, wherein the controlled impedance is referenced to the common node.

6. The ballast circuit claimed in claim 2, wherein the inductor of the clamping circuit is serially coupled between the drive winding and the common node.

7. The ballast circuit claimed in claim 2, wherein the clamping circuit further comprises a filter circuit for filtering the error signal provided by the difference amplifier.

8. The ballast circuit claimed in claim 1, wherein the feedback signal represents lamp current.

9. The ballast circuit claimed in claim 1, wherein the gate drive circuit further comprises:
    a bidirectional voltage clamp connected between the common node and the control nodes for limiting positive and negative excursions of voltage of the control nodes with respect to the common node,
    the clamping circuit cooperating with the voltage clamp such that the phase angle between the fundamental frequency component of voltage across the resonant load circuit and the a.c. current approaches zero during lamp ignition.

10. The ballast circuit claimed in claim 1, wherein the clamping circuit further comprises a capacitor coupled across the inductor for cooperatively assisting in clamping voltage of the inductor.

11. The ballast circuit of claim 1, wherein the clamping circuit includes a bidirectional voltage clamp for limiting voltage across the inductor during lamp ignition.

12. A control process in a dimmable ballast circuit for a gas discharge lamp, comprising:
    generating an a.c. voltage at a common node of a self-oscillating complementary converter circuit;
    coupling the a.c. voltage to a resonant load circuit by means of a drive winding; and
    controlling the voltage at a control node of the of the complementary converter circuit by clamping a voltage across an inductor that is connected to the drive winding and directly coupled at its terminals to a clamping circuit.

13. The control process claimed in claim 12, further comprising clamping the voltage across the inductor in accordance with an error signal representing a difference between a user-selectable set point signal and a feedback signal representing a time-averaged value of a lamp operating parameter.

14. The control process claimed in claim 13, further comprising sensing a user-selectable set point signal from a user-selectable d.c. bus voltage of the ballast circuit.

15. The control process claimed in claim 14, further comprising sensing a feedback signal from a lamp current signal.

* * * * *